(12) United States Patent
Bork et al.

(10) Patent No.: US 11,192,470 B2
(45) Date of Patent: Dec. 7, 2021

(54) VEHICLE DEVICE SYSTEM

(71) Applicant: Volkswagen Aktiengesellschaft, Wolfsburg (DE)

(72) Inventors: Simon Bork, Calberlah (DE); Sebastian Alisch, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 224 days.

(21) Appl. No.: 16/685,443

(22) Filed: Nov. 15, 2019

(65) Prior Publication Data
US 2020/0079243 A1  Mar. 12, 2020

Related U.S. Application Data

(63) Continuation of application No. PCT/EP2018/062662, filed on May 16, 2018.

(30) Foreign Application Priority Data

May 18, 2017  (DE) ...................... 10 2017 208 446.4

(51) Int. Cl.
*B60N 2/07* (2006.01)
*B60N 2/00* (2006.01)
(Continued)

(52) U.S. Cl.
CPC ........... *B60N 2/0715* (2013.01); *B60N 2/002* (2013.01); *B60N 2/071* (2013.01); *B60N 2/5678* (2013.01);
(Continued)

(58) Field of Classification Search
CPC .... B60N 2/5678; B60N 2/002; B60N 2/0715; B60N 2/071; B60N 3/001; B60N 2/0228; B60R 21/207; B60R 16/03; B60R 22/195
See application file for complete search history.

(56) References Cited

U.S. PATENT DOCUMENTS 5,412,964 A * 5/1995 Yee ........................ B60N 2/20
297/378.14
6,663,157 B1  12/2003 Hofmann et al.
(Continued)

FOREIGN PATENT DOCUMENTS

CN    101600597 A   12/2009
DE    196 44 219 C1  11/1997
(Continued)

OTHER PUBLICATIONS

Chinese Office Action for Chinese Application No. 201889932959.X dated Jun. 29, 2021 with English translation.

*Primary Examiner* — Milton Nelson, Jr.
(74) *Attorney, Agent, or Firm* — Muncy, Geissler, Olds & Lowe, P.C.

(57) ABSTRACT

A vehicle device system for a motor vehicle, having at least one vehicle device, in particular a vehicle seat or vehicle table, and comprising a mount fastened or fastenable to a vehicle body for detachably locking the vehicle device to the vehicle body, and comprising a key-operated switch, which establishes or interrupts at least one electrical contact between the vehicle device and the vehicle depending on its switching position. It is provided that the key-operated switch is fastened on the vehicle device, which is longitudinally displaceably mounted/mountable on the mount, and interacts with a contact carriage, which is longitudinally displaceably mounted on the mount.

13 Claims, 2 Drawing Sheets

(51) Int. Cl.
*B60N 2/56* (2006.01)
*B60N 3/00* (2006.01)
*B60R 16/03* (2006.01)
*B60R 21/207* (2006.01)
*B60R 22/195* (2006.01)

(52) U.S. Cl.
CPC .............. *B60N 3/001* (2013.01); *B60R 16/03* (2013.01); *B60R 21/207* (2013.01); *B60R 22/195* (2013.01)

(56) References Cited

U.S. PATENT DOCUMENTS

| | | | | |
|---|---|---|---|---|
| 6,942,273 | B1 * | 9/2005 | Jseng | B60R 25/014 |
| | | | | 296/65.15 |
| 7,284,989 | B1 * | 10/2007 | Hanlon | B60N 2/01508 |
| | | | | 296/65.03 |
| 7,419,205 | B2 * | 9/2008 | Tsukamoto | B60N 2/0155 |
| | | | | 248/503.1 |
| 8,998,332 | B2 | 4/2015 | Teufel et al. | |
| 2005/0218687 | A1 | 10/2005 | Tseng | |
| 2010/0026070 | A1 | 2/2010 | Rohee et al. | |
| 2015/0033809 | A1 | 2/2015 | Mueller et al. | |

FOREIGN PATENT DOCUMENTS

| | | |
|---|---|---|
| DE | 198 25 439 C2 | 4/2002 |
| DE | 10 2009 024 631 A1 | 2/2010 |
| DE | 10 2012 003 333 A1 | 5/2013 |
| EP | 2 298 609 A2 | 3/2011 |
| EP | 2 675 654 B1 | 3/2015 |
| WO | WO 99/16637 A1 | 4/1999 |

* cited by examiner

VEHICLE DEVICE SYSTEM

This nonprovisional application is a continuation of International Application No. PCT/EP2018/062662, which was filed on May 16, 2018, and which claims priority to German Patent Application No. 10 2017 208 446.4, which was filed in Germany on May 18, 2017, and which are both herein incorporated by reference.

BACKGROUND OF THE INVENTION

Field of the Invention

The present invention relates to a vehicle device system for a motor vehicle, comprising at least one vehicle device, in particular a vehicle seat or vehicle table, and comprising a mount fastened or fastenable to a vehicle body for detachably locking the vehicle device to the vehicle body, and comprising a key-operated switch, which establishes or interrupts at least one electrical contact between the vehicle device and the vehicle depending on its switching position.

Description of the Background Art

Vehicle device systems of the type mentioned at the outset are already known from the prior art. For example, the unexamined patent application DE 196 44 219 C1 discloses a vehicle seat, which is detachably fastened to a seat mount. For this purpose, a key-operated switch is provided, which releases the vehicle seat or locks it to the seat mount depending on the rotational position of a closing cylinder. The key-operated switch is designed in such a way that it may be actuated only by the ignition key, which interacts with the ignition lock of the motor vehicle. This ensures that the vehicle seat is detachable only when the ignition is switched to "zero," and the motor vehicle is thus in a safe operating state. The disclosed approach has the disadvantage that the key-operated switch is assigned to the seat bearing, fixed to the vehicle body, and thereby takes up corresponding installation space next to the vehicle seat in the motor vehicle interior. However, with the increasing complexity of seat bearings which are intended to permit a height adjustment, a longitudinal adjustment and possibly also a rotation of the vehicle seat around a vertical axis, the installation space in the area of the seat mount is narrowly dimensioned.

SUMMARY OF THE INVENTION

It is therefore an object of the present invention to provide a vehicle device system, which offers an improved installation space utilization and functional variety without resulting in a notable cost increase.

The object of the invention is achieved by a vehicle device system in that the key-operated switch is assigned to the vehicle device and thus is able to move together with the vehicle device. The installation space is thus occupied in the area of the vehicle device and released in the area of the mount, whereby an overall optimization of the installation space utilization results. For this purpose, according to the invention, the key-operated switch is longitudinally displaceably fastened to the vehicle device mounted/mountable on the mount and interacts with a contact carriage, which is longitudinally displaceably mounted on or via the mount, in particular the seat mount and/or the table mount. Due to the fact that the key-operated switch interacts with a longitudinally displaceably contact carriage, the establishment of the electrical contact between the vehicle device and the motor vehicle is ensured independently of the longitudinal displacement position of the vehicle device on the mount. Due to the fact that the contact carriage is longitudinally displaceably mounted on the seat mount, it is able to move together with the vehicle mount, so that an electrical contact interface between the vehicle device or the key-operated switch and the motor vehicle or the mount is able to move together with the vehicle mount and is therefore present independently of the longitudinal displacement position of the vehicle device. The vehicle device is preferably a vehicle seat or a vehicle table, both of which are longitudinally displaceably mounted or mountable via the mount in the motor vehicle. The mount is preferably designed accordingly as a seat mount or a table mount, as mentioned above. The mount is particularly preferably designed as a seat mount and table mount, so that either a vehicle seat or a vehicle table may be longitudinally displaceably disposed on the mount, so that a greater design freedom for using the mount is available to the user.

It is furthermore provided that the mount has a longitudinal guide for longitudinally displacing the vehicle device or the vehicle seat or the vehicle table as well as a guide rail, which extends in parallel to the longitudinal guide and longitudinally displaceably carries the contact carriage. Due to the parallel arrangement of the longitudinal guide and the guide rail, it is ensured that the electrical contact may be ensured on the mount over the entire displacement range of the vehicle device, in particular without a relative movement between the vehicle device and the contact carriage being able to take place transversely to the longitudinal direction. If the electrical contact is established by a physical contact, in particular, a maintenance of the electrical contact is securely ensured by the parallel guidance.

The guide rail can have a guide groove provided with a C-shaped design in cross section, and the contact carriage has a T-shaped guide profile held in the guide groove.

The C-shaped design of the guide groove and the T-shaped design of the contact carriage on the guide profile is achieved in that the contact carriage is captively held in a form-fitting manner in the guide groove, at least in the direction transverse to the displacement direction. The guide groove is provided with an open-edged design at least at one longitudinal end, so that the contact carriage may be inserted into or removed from the guide groove in the sliding direction.

The key-operated switch can have a closing cylinder, which is mechanically connected to a locking lever and may be brought into engagement with or disengagement from the contact carriage at least by a rotational movement of the closing cylinder. By actuating the key-operated switch with the aid of the corresponding, fitting key, the closing cylinder is rotatable, and the locking lever is thereby displaceable, in particular pivotable. The locking lever advantageously has a locking, for example, an entrainment projection, which is disposed or formed, in particular on the end of the locking lever facing away from the closing cylinder for the purpose of interacting with the contact carriage in a form-fitting manner in at least one rotational position of the closing cylinder in such a way that a longitudinal movement of the vehicle device relative to the seat mount is transmitted to the contact carriage, and the contact carriage is thereby entrained in the guide groove. In a second rotational position or switching position, the lock is brought into disengagement from the contact carriage, so that the vehicle device is able to be displaced independently of the contact carriage, for example to remove the vehicle device from the seat mount.

The locking lever and/or the closing cylinder can be axially displaceable for the engagement or disengagement—with respect to the rotational axis of the closing cylinder. The entrainment is thereby operatively connectable to the contact carriage in a form-fitting manner by an axial or a longitudinal movement transverse to the sliding direction of the contact carriage and/or the vehicle device. For this purpose, the contact carriage preferably has a receiving recess, into which the entrainment, which is designed, for example, as an entrainment bolt or pin, is insertable or removable by the axial movement. The axial movement may cause the operative connection to the contact carriage in addition or alternatively to the pivoting movement.

The vehicle device also can have a support, on which the closing cylinder and the locking lever are mounted. The support is advantageously designed to be fixed to the vehicle device or as a support for the vehicle device. The support is, in particular, assigned to the seat part of the vehicle device. The support is preferably designed as a guide element interacting with the longitudinal guide.

Further, one or multiple electric physical contact points can be arranged on the guide element and/or on the locking lever and can be connected to one or multiple electrical assemblies of the vehicle device. The physical contact points are used for the electrical contacting of the electrical assembly or assemblies of the vehicle device, so that the electrical assemblies are easily electrically connectable to, for example, a control unit of the motor vehicle or an energy source of the motor vehicle during the mounting of the vehicle device on the mount via the physical contact for the purpose of operating the assembly or assemblies. The physical contact points are, in particular, electrically conductive contact plates or contact pins, which are fixedly mounted or spring-mounted on the support and/or the locking lever to ensure a permanently secure electrical physical contacting.

The contact carriage can also have one or multiple physical mating contact elements, which is/are electrically connected or connectable to a control unit and/or an electrical power supply of the motor vehicle and is/are in electrical physical contact with at least one of the physical contact elements on the support and/or the locking lever in at least one switching position of the key-operated switch. The electrical contacting of the vehicle device thus takes place via the physical mating contact elements arranged on the contact carriage, which are movable together with the contact carriage due to their arrangement in the contact carriage, so that the electrical contact with the vehicle device by the contact carriage is subsequently ensured. According to a first specific embodiment, the physical contact is preferably independent of the switching position of the key-operated switch, so that the physical contact exists in both or multiple switching positions of the key-operated switch. In this case, the key-operated switch alone is used for the mechanical connection between the contact carriage and the vehicle device. Alternatively, according to another specific embodiment, it is preferably provided that the electrical contact is released or interrupted in at least one second switching position of the key-operated switch, so that it is possible to easily electrically test whether the vehicle device has been properly fastened or locked on the seat mount by actuating the key-operated switch. At least one contact point is thus preferably designed to electrically detect the first switching position (closed switching position) of the key-operated switch.

In order for the physical mating contacts of the contact carriage to be permanently electrically connected to the vehicle-side control unit and/or the energy store, a cable carrier, a winding system and/or a flexible conductor strip for electrical conductors, which connects the physical mating contacts to the control unit and/or power supply, is preferably assigned to the contact carriage. An easy and stress-free guidance and adjustment of the electric conductors for the electrical contacting of the physical mating contacts of the contact carriage is ensured by the cable carrier, winding system and/or flexible conductor strip. One end of the cable carrier or the conductor strip is assigned to the contact carriage, and the other end is assigned to the mount and/or the vehicle-side control unit.

The vehicle device preferably includes a control unit, a seat heater, a seat ventilation system, a seat cooling system, a seat occupancy sensor, a seatbelt tightening assembly, a seat adjusting assembly, in particular with a memory function, a seatbelt lock, a power connection, in particular an outlet/charging socket, an entertainment system, operating switches, a massage assembly and/or an airbag assembly as the electrical assembly. Due to the advantageous contact points of the key-operated switch with the contact carriage, the different assemblies may be individually actuated or activated by the vehicle-side control unit for the purpose of individually actuating the assemblies assigned to the vehicle device and optimizing the comfort or safety for the user. The aforementioned assemblies are provided, in particular completely or partially for the vehicle seat. If the vehicle device is designed as a vehicle table, an output/charging socket, for example a USB connection, an integrated refrigerator, a coffee maker or other electrical consumers, for example from the camping sector, are present, in particular, as the electrical assembly.

At least one of the physical contacts or physical mating contacts can be spring-mounted. For example, the particular physical contact or physical mating contact is spring-mounted against the physical contact active direction, so that, when the physical contact and physical mating contact strike each other, at least one of the two may yield. Due to the resulting spring pretension, it is ensured that the electrically conductive physical contact is continuously maintained even if vibrations occur. The particular physical contact and/or physical mating contact are also optionally optimized with respect to the electrical contact by an advantageous surface condition and/or an advantageous surface profile, for example by providing a predetermined surface roughness or, for example, dimples.

The control unit on the motor vehicle side can be configured to determine a completed electrical or correct contacting of the one or multiple assemblies of the vehicle device. This makes it possible to easily facilitate the contacting. For this purpose, the control unit is designed, for example, to carry out electrical tests, with the aid of which it is possible to determine that an electrical contacting of all assemblies has safely occurred.

The contact carriage can include at least one microswitch, which is actuatable by the key-operated switch and is connected to the control unit (on the vehicle side). It is easily and advantageously possible to determine whether the key-operated switch was correctly actuated by actuating the microswitch.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
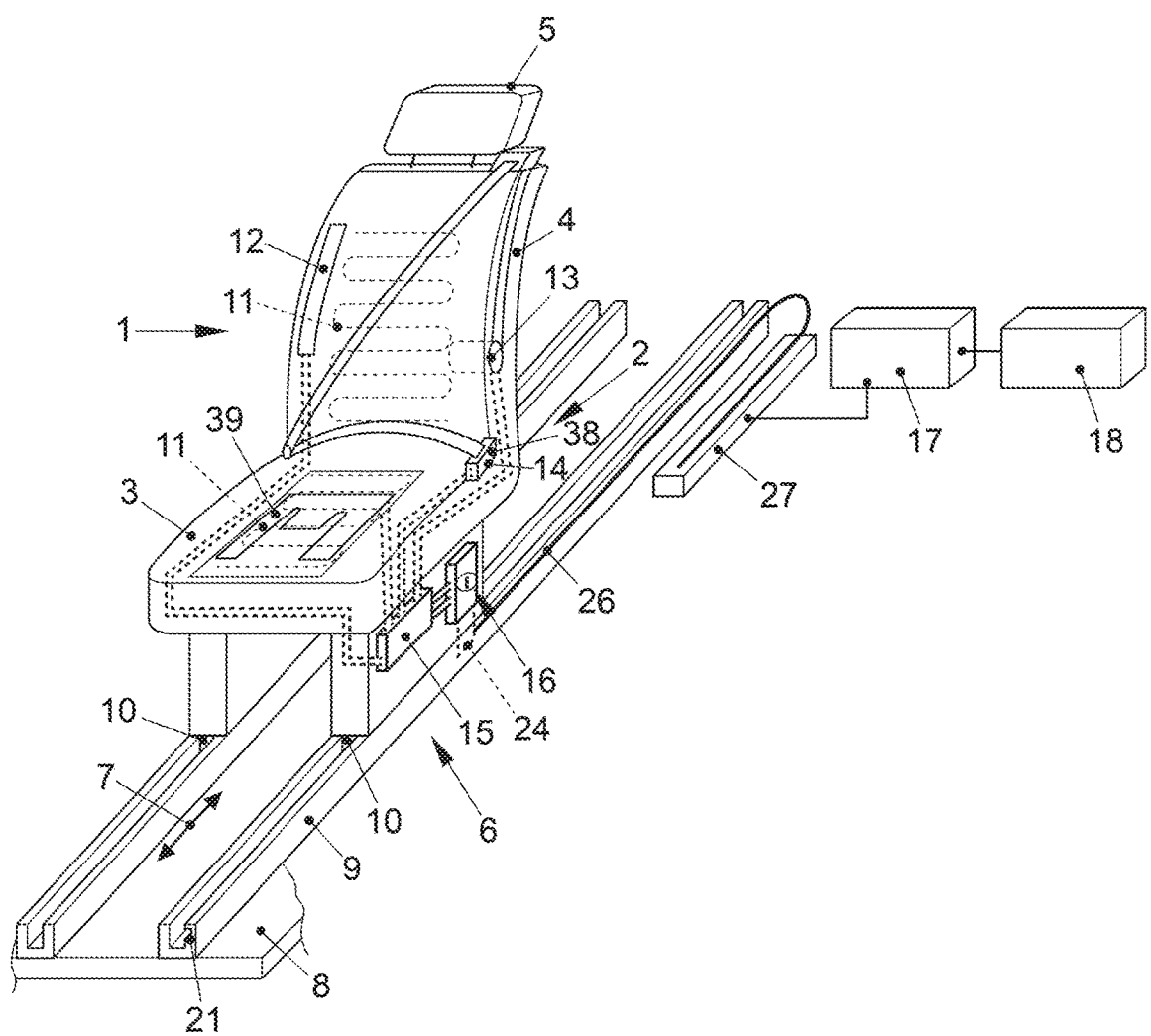
FIG. 1 shows a vehicle seat system in a simplified perspective representation.

FIG. 1 shows a simplified perspective representation of a vehicle seat system 1 for a motor vehicle, comprising a vehicle device, a vehicle seat 2 in the present case, which has a seat part 3 and a backrest 4 with a headrest 5 arranged thereon, as well as a mount 6, which permits a longitudinally displaceable mounting, indicated by a double arrow 7, of the vehicle seat 2 on vehicle body 8 of the motor vehicle. In this respect, mount 6 is designed as a seat mount in the present exemplary embodiment.

For this purpose, mount 6 has two longitudinal guides 9 oriented in parallel to each other, which are designed in the manner of rail guides. Vehicle seat 2 is longitudinally displaceably mounted/mountable together with seat part 3 on longitudinal guides 9. For this purpose, longitudinal guides 9 are designed, for example as rails having longitudinal grooves, into which seat part 3 is insertable together with guide elements 10. Vehicle seat 2 may be locked or held in multiple sliding positions along longitudinal guides 9, it being possible to use, for example, known engagement systems for this purpose.

Vehicle seat 2 has multiple electrical assemblies, for example a seat heater 11, an airbag assembly 12, an activatable seatbelt tightener 13, a seatbelt lock sensor 14 and a control unit 15. Vehicle seat 2 may optionally also have a seat cooling system, a seat ventilation system, a seatbelt lock 38 and/or a seat occupancy sensor 39. In the present case, control unit 15 is connected to the other assemblies by electrical cables for the purpose of activating them as needed or to receive and evaluate signals thereof. A key-operated switch 16 is also disposed on vehicle seat 2. With the aid of this key-operated switch 16, an electrical connection may be established from control unit 15 to a vehicle-side control unit 17, which is connected to electrical assemblies of the motor vehicle, for example an airbag control unit 18, an energy store or the like via additional electrical cables. Key-operated switch 16 has two different switching or rotational positions for this purpose, an electrical connection being established in the first rotational position and the electrical connection being interrupted or released in the second rotational position.

Figure 2:
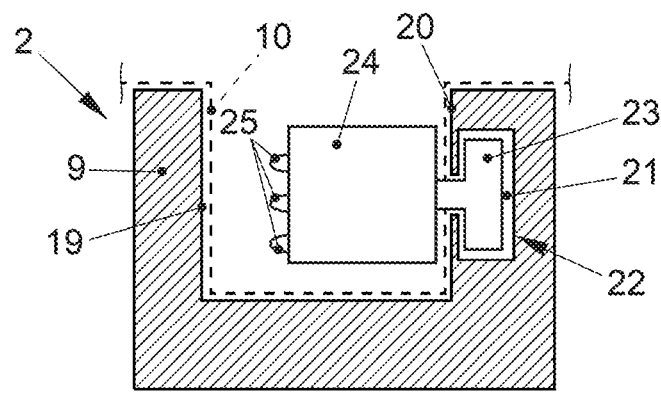
FIG. 2 shows a first detailed sectional representation of the vehicle seat system.

In a simplified representation of vehicle seat system 1, FIG. 2 shows one of longitudinal guides 9 of seat mount 6. Guide groove 19 in particular longitudinal guide 9 is provided with a U-shaped design. Another guide groove 21, which has a C-shaped cross section, is formed on one of diametrically opposed side walls 20 of guide groove 19. Due to the fact that guide groove 21 is integrated into side wall 20 of longitudinal guides 9, it forms a guide rail 22 extending in parallel to longitudinal guide 9. A T-shaped profile 23 of a contact carriage 24 is longitudinally displaceably mounted in guide groove 21. Contact carriage 24 projects into the interior of guide groove 19 and has multiple physical mating contact elements 25 on its side facing away from side wall 20. Physical mating contact elements 25 are designed as electrically conductive contact pins or contact plates and are connected to vehicle-side control unit 17 by electrical cables. For this purpose, a flexible conductor strip 26 having multiple electrical conductors is assigned to contact carriage 24, which is connected on its other end to control unit 17 or a distributor 27. Instead of a flexible conductor strip, individual conductors may also be present with the aid of a cable carrier or a winding system.

Figure 3:
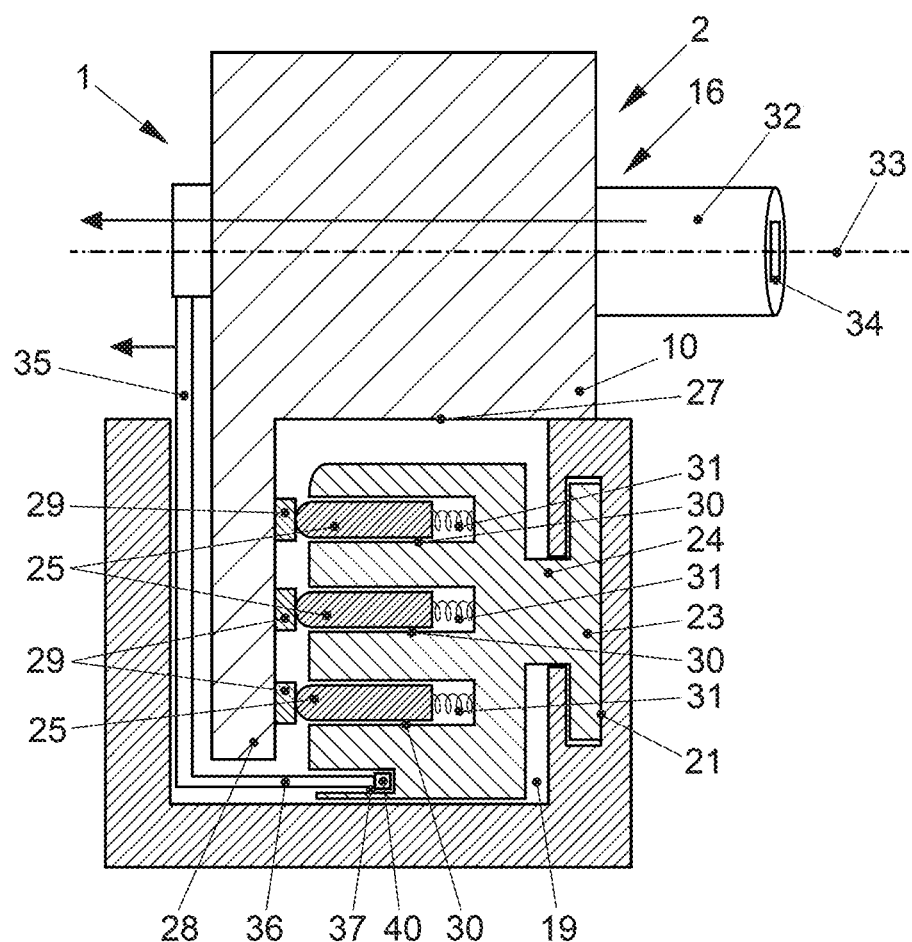
FIG. 3 shows a second detailed sectional representation of the vehicle seat system.

In another detailed sectional representation, FIG. 3 shows longitudinal guide 9, including vehicle seat 2 disposed therein. A recess 27 is formed on at least one of guide elements 10 for receiving contact carriage 24, so that a projection 28 remains, which runs past contact carriage 24 in the direction of the base of guide groove 19.

Multiple electrically conductive contact elements 29 are arranged on projection 28, so that they are situated opposite mating contact elements 25 when contact carriage 24 is at the height of projection 28, viewed in the longitudinal displacement direction according to double arrow 7. According to the advantageous exemplary embodiment illustrated in FIG. 3, mating contact elements 25 are each longitudinally displaceably mounted in a recess 30 of contact carriage 24, and they are able to penetrate recess 30 against the force of a spring element in each case. Due to spring elements 31, mating contact elements 25 are thus forced in the direction of contact elements 29, so that a permanent electrical physical contact is ensured. The electrical connection between control unit 17 and control unit 15 easily takes place via these contact points.

Key-operated switch 16 has a closing cylinder 32, which is rotatable around a rotation axis 33 when the key provided for this purpose is inserted into key receptacle 34 of closing cylinder 32. In particular, closing cylinder 32 is designed to be rotatable only when the ignition key of the motor vehicle is correctly inserted into key opening 34. On the end facing away from key opening 34, closing cylinder 32 is mechanically connected to a locking lever 35, which has an entrainment projection 36 on the end facing away from closing cylinder 32, which extends in the direction of key opening 34, in particular in parallel to rotation axis 33. When closing cylinder 32 is rotated around rotation axis 33, locking lever 35 is also pivoted. It may brought into engagement with or disengagement from contact carriage 34 thereby, in that entrainment projection 36 pivots into or pivots out of a receiving opening 37 of contact carriage 24.

It is preferably provided that closing cylinder 32 and locking lever 35 are also displaceably mounted axially, i.e. in the direction of rotation axis 33, so that entrainment projection 36 my be inserted into and removed from recess 37 in a combined rotational and pivoting movement. In particular, the axial displacement results in the fact that entrainment projection 36 is insertable laterally into recess 37 and a form-locking connection interacts thereby with contact carriage 24 in both sliding directions according to double arrow 7, so that contact carriage 24 is always entrained or pushed during a movement of vehicle seat 2, so that the electrical physical contact is always maintained.

A microswitch 40 is also optionally disposed in recess 37, which is actuatable or actuated by entrainment projection 36 when locking lever 35 is inserted into recess 37 together with entrainment projection 36. Microswitch 40 is electrically connected to control unit 17, which detects the correct contacting or actuation of key-operated switch 16 as a function of the actuation of microswitch 40.

If key-operated switch 16 is moved into a second switching position, which is not illustrated, by inserting the appropriate ignition key into key opening 34, so that entrainment projection 36 is brought into disengagement from contact carriage 24, vehicle seat 2 is moved independently of contact carriage 24 and may, for example, be removed from seat mount 6.

A simple electrical connection between vehicle seat 2 and the electronics on the motor vehicle side may thus be established with the aid of key-operated switch 16. Due to the electrical connection, it is furthermore possible to check whether vehicle seat 2 is correctly mounted and key-operated switch 16 was moved into the correct switching position. This results in the advantage that, for example, a vehicle startup may be prevented if it is determined that vehicle seat 2 is not correctly mounted and, in particular, the electrical connection was not established.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle device system for a motor vehicle, the system comprising:
    at least one vehicle device;
    a mount fastened or fastenable to a vehicle body for detachably locking the vehicle device to the vehicle body; and
    a key-operated switch that establishes or interrupts at least one electrical contact between the vehicle device and the vehicle as a function of a switching position,
    wherein the key-operated switch is fastened on the vehicle device, which is longitudinally displaceably mountable on the mount and interacts with a contact carriage that is longitudinally displaceably mounted on the mount.

2. The vehicle device system according to claim 1, wherein the mount has a longitudinal guide for the longitudinal displacement of the vehicle device as well as a guide rail, which extends in parallel to the longitudinal guide and longitudinally displaceably carries the contact carriage.

3. The vehicle device system according to claim 2, wherein the guide rail has a guide groove provided with a C-shaped design in cross section, and wherein the contact carriage has a T-shaped guide profile held in the guide groove.

4. The vehicle device system according to claim 1, wherein the key-operated switch has a closing cylinder, which is mechanically connected to a locking lever and is adapted to be brought into engagement with or disengagement from the contact carriage at least by a rotational movement of the closing cylinder.

5. The vehicle device system according to claim 4, wherein the locking lever and/or the closing cylinder are axially displaceable for the engagement or disengagement, with respect to a rotation axis of the closing cylinder.

6. The vehicle device system according to claim 4, wherein the vehicle device has a guide element, on which the closing cylinder and the locking lever are mounted.

7. The vehicle device system according to claim 6, wherein one or multiple electric physical contact elements is/are arranged on the guide element and/or on the locking lever and is/are electrically connected to one or multiple electrical assemblies of the vehicle device.

8. The vehicle device system according to claim 7, wherein the contact carriage has one or multiple physical mating contact elements, which is/are electrically connectable to a control unit of the motor vehicle and is/are in electrical physical contact with at least one of the electric physical contact elements in at least one switching position of the key-operated switch.

9. The vehicle device system according to claim 8, wherein, a winding system and/or a flexible conductor strip for electrical conductors which connect the physical mating contact elements to the control unit, is/are assigned to the contact carriage.

10. The vehicle device system according to claim 8, wherein the contact carriage includes at least one microswitch, which is actuatable by the key-operated switch and is connected to the control unit.

11. The vehicle device system according to claim 8, wherein at least one of the electric physical contacts contact elements or the physical mating contact elements is spring-mounted.

12. The vehicle device system according to claim 8, wherein the control unit is configured to detect a completed contacting of the one or multiple assemblies of the vehicle device.

13. The vehicle device system according to claim 1, wherein the vehicle device is a vehicle seat and has, as assemblies: a control unit, a seat heater, a seat cooling system, a seat occupancy sensor, a seatbelt tightening assembly, a seat adjusting assembly, a seatbelt lock and/or an airbag assembly.

* * * * *